Feb. 22, 1955     O. R. ROGNEBY     2,702,502
SOD CUTTER

Filed May 28, 1949     3 Sheets-Sheet 1

Inventor
Olaf R. Rogneby
By Williamson & Williamson
Attorneys

Feb. 22, 1955  O. R. ROGNEBY  2,702,502
SOD CUTTER
Filed May 28, 1949  3 Sheets-Sheet 2
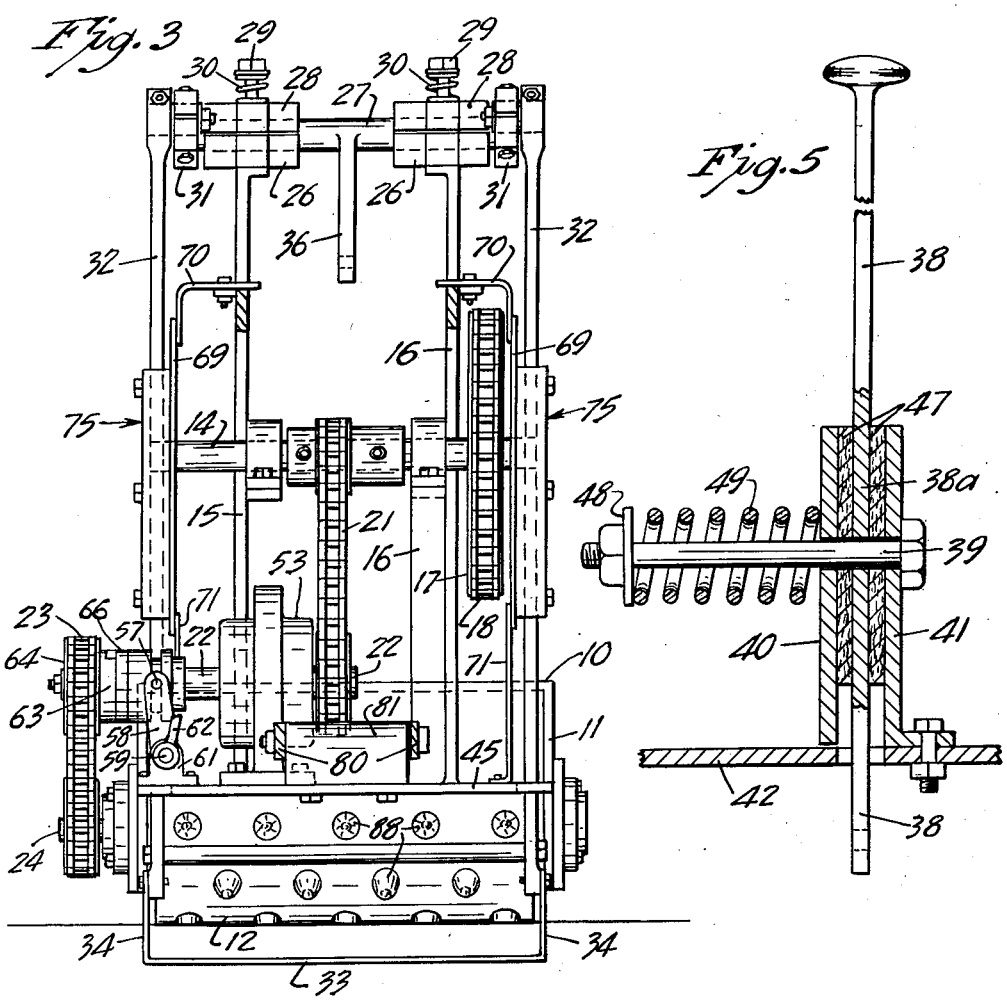
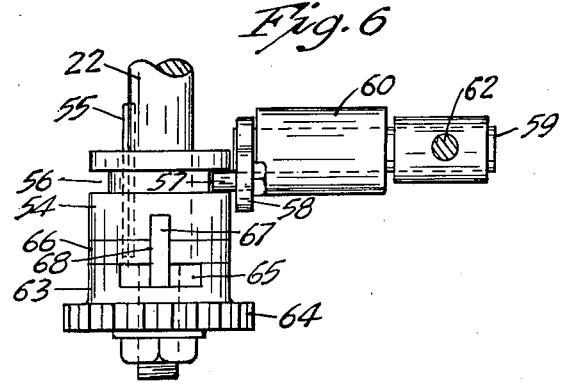
Inventor
Olaf R. Rogneby
By Williamson & Williamson
Attorneys Feb. 22, 1955   O. R. ROGNEBY   2,702,502
SOD CUTTER
Filed May 28, 1949   3 Sheets-Sheet 3
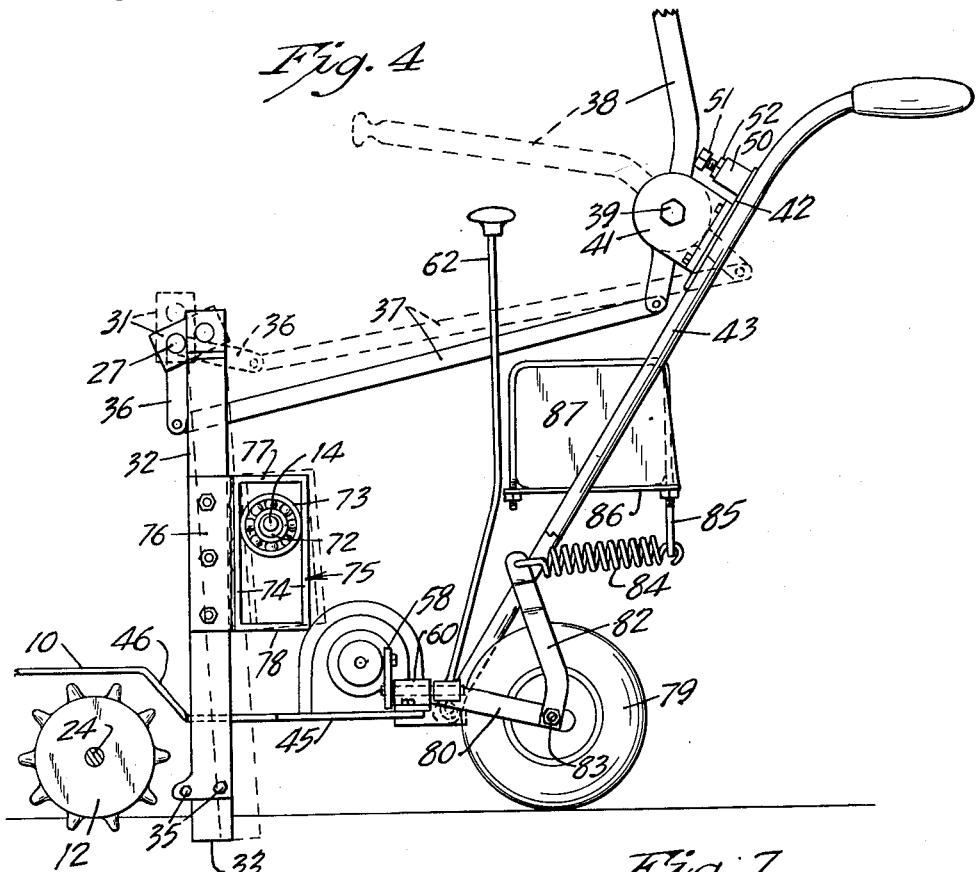
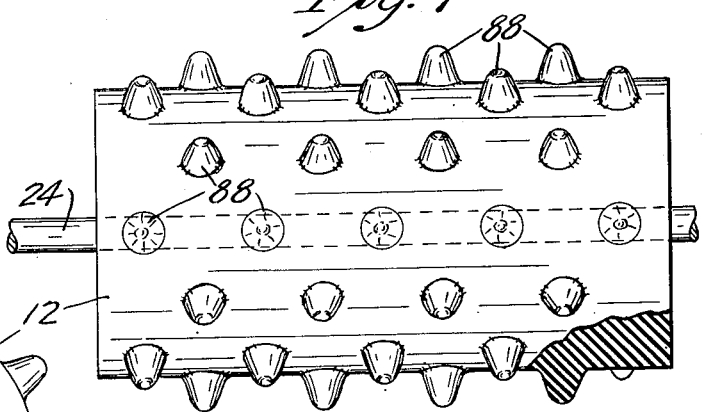
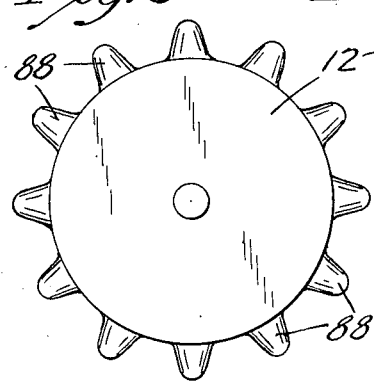
Inventor
Olaf R. Rogneby
By Williamson & Williamson
Attorneys

United States Patent Office 2,702,502
Patented Feb. 22, 1955

2,702,502

SOD CUTTER

Olaf R. Rogneby, Minneapolis, Minn.

Application May 28, 1949, Serial No. 96,087

5 Claims. (Cl. 97—226)

This invention relates to sod cutters.

It is an object of the invention to provide a power driven sod cutter having a reciprocating knife and drive means therefor which is tightly enclosed to prevent dust and other foreign matter from entering the drive means and causing excessive wear.

Another object of the invention is to provide means whereby the cutter can be raised and lowered relative to its drive or actuating connection without disturbing the enclosed condition thereof.

A further object of the invention is to provide improved raising and lowering means for the cutter whereby it can be readily held in desired positions for varied depths of cut and wherein the cutter is positioned closely adjacent the main frame supporting traction roller so that variations in the contour of the sod will not materially affect the thickness of the strip being cut.

Another object of the invention is to provide an improved pivotal suspension for the cutting blade hanger which insures a constant takeup to compensate for wear so that the pivotal mounting of the cutter hanger has an unusually long life.

A further object of the invention is to provide an improved traction roller clutch construction.

Still another object of the invention is to provide a greatly improved form of traction roller per se.

The above and other objects and advantages of the invention will more fully appear from the following description made in connection with the accompanying drawing wherein like reference characters refer to the same parts throughout the views, and, in which:

Figure 3 is a transverse vertical sectional view;

Figure 4 is a somewhat diagrammatic side elevational view of the blade assembly with its driving and adjusting means and a spring mounted rear wheel construction;

Figure 5 is an enlarged sectional detail of a portion of the blade adjusting lever unit;

Figure 6 is an enlarged detail of the clutch mechanism;

Figure 7 is a side elevational view of the traction roller; and

Figure 8 is an end view of the roller.

Figure 1:
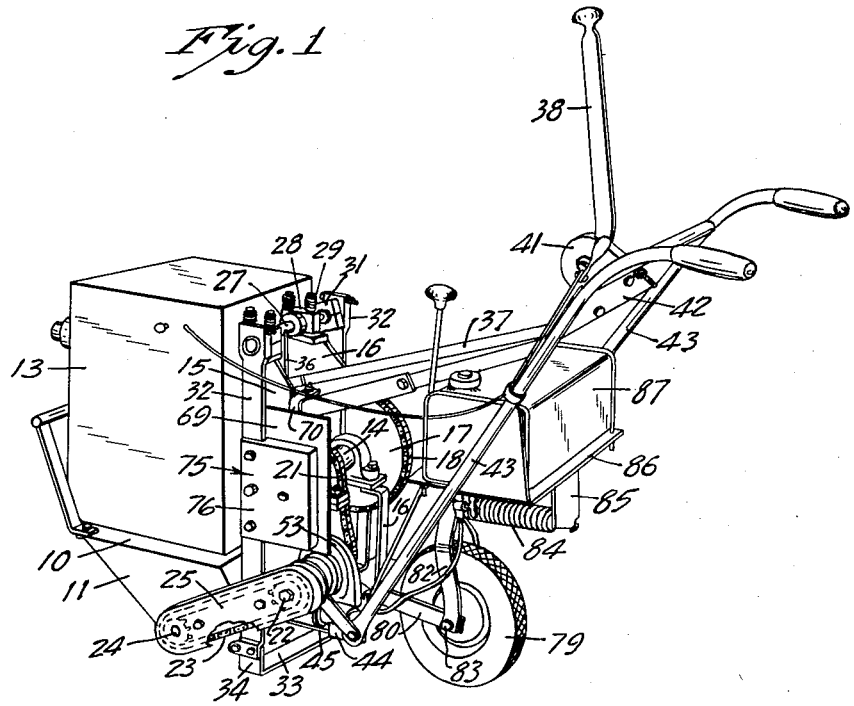
Figure 1 is a rear perspective view of an embodiment of the invention.
Figure 2:
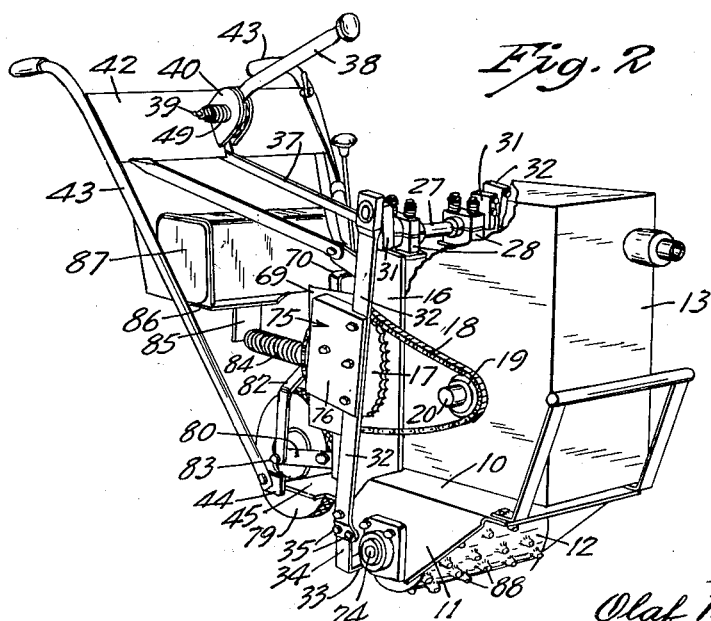
Figure 2 is a front perspective view showing the opposite side thereof.

The machine includes a generally horizontal frame plate 10 having downwardly extending side members 11 between which is journalled a traction roller 12.

On the frame plate 10 is a power plant 13 which is indicated diagrammatically but is preferably in the form of a small internal combustion engine. A cross shaft 14 is journaled between frame uprights 15 and 16. On the shaft 14 is a sprocket 17 which is driven by a chain 18 extending to a sprocket 19 on the internal combustion engine power shaft 20. The cross shaft 14 is connected by a chain 21 to a lower transverse stud shaft 22. This is in turn connected by a chain 23 to a traction roller shaft 24. The ends of the shafts 22 and 24 and the chain 23 are enclosed by a casing 25 to keep dust and other foreign matter from them.

The frame uprights 15 and 16 extend upwardly beyond the cross shaft 14 and their upper ends have bearing caps 26 thereon and in which rests an upper cross shaft 27. Complementary bearing caps 28 lie on the upper sides of the cross shaft 27 and are connected to the lower caps 26 by means of studs 29 in which are compression springs 30 which pull the bearing caps 26 and 28 together to maintain a close fit about the upper cross shaft 27.

The upper cross shaft 27 extends outwardly beyond the bearing caps 26 and 28 and the ends have crank arms 31 therein. Pivotally connected to the ends of the crank arms 31 are blade hangers 32 which extend downwardly at each side of the machine to points below a horizontal frame plate 10. Extending between the lower ends of the blade hangers 32 is a blade 33 having upturned ends 34 which are secured to the hangers by means of studs 35.

The upper cross shaft 27 has a lever arm 36 extending therefrom approximately at the longitudinal center thereof. The lever arm 36 is connected by a link 37 to the lower end of a hand lever 38. The lever 38 is mounted on a pivot bolt 39 which extends through a pair of brackets 40 and 41, the latter bracket being carried by a cross member 42 which extends between a pair of guiding handles 43. The bracket 40 is not connected to the cross member 42. The handles 43 extend downwardly and forwardly from the rear of the machine and connect to brackets 44 on the rear corners of the frame plate 45 which as shown in Figure 4 is connected to the forward frame plate 10 by means of a downwardly and rearwardly extending medial portion 46.

The hand lever 38 has an enlarged generally circular portion 38a which lies between a pair of friction discs 47 on the inner sides of the brackets 40 and 41. The pivot bolt 39 which supports the hand lever 38 is shown in Figure 5 to extend a considerable distance outwardly from the bracket 40. Between a nut and washer assembly 48 and the bracket 40 is a compression spring 49 which presses the bracket 40, the friction discs 47 and the enlarged hand lever portion 38a toward the anchored bracket 41.

Also carried by the cross member 42 which extends between the handles 43 is a block 50 into which is threaded a stud 51 having a lock nut 52 thereon. This stud is aligned with the hand lever 38 to adjustably limit the rearward swinging movement of said lever.

When the lever 38 is in its rearward or full line position as shown in Figure 4 the lever arm 36 on the upper cross shaft 27 will be swung forwardly and the blade hangers 32 will be pushed downwardly and when the movement of the lever 38 is reversed the blade hangers 32 will be raised.

The stud shaft 22 driven by the chain 21 from the intermediate cross shaft 14 has a conventional gear reduction unit 53 interposed therein and the outer end of the shaft, as best shown in Figure 6, has a clutch collar 54 mounted thereon for sliding movement on a key 55 which causes the collar to rotate with the stud shaft 22. The collar is provided with a circumferential groove 56 to receive a pin 57 on a short lever 58 which extends downwardly to a short shaft 59 supported by a sleeve 60 which is in turn carried by a bracket 71 on the rearward frame plate 45. The rear end of the short shaft 59 has a clutch lever 62. When the clutch lever 62 is shifted laterally it will rock the short shaft 59 and slide the clutch collar 54 on the stud shaft 22.

Mounted for rotation on the stud shaft 22 is a hub 63 having a sprocket 64 formed thereon. The hub 63 is provided with a cut-out 65. Between the hub 63 and the clutch collar 54 is a ring 66. Extending toward the hub 63 from the clutch collar 54 is a tooth 67 which is anchored in the clutch collar and which passes through a suitable notch 68 in the ring 66. The ring 66 is also mounted for sliding movement on the shaft 22 and key 55.

This clutch structure with its ring 66 interposed between the collar 54 and the sprocket hub 63 is one which has been found to maintain the tooth 67 in alignment with the axis of the shaft 22 even though there might be some wear of the clutch collar 54 and aligned ring 66 on the shaft 22. By maintaining the tooth 67 in the proper alignment it has been found that there is considerably less likelihood of shearing the tooth 67 when the latter is engaged with the sprocket hub 63 upon shifting of the clutch collar 54 to bring the tooth 67 into the cutout 65 in said hub.

The drive means for the blade hangers 32 is of particular importance. The intermediate cross shaft 14 at the left-hand side of the machine passes through a housing plate 69 which is supported by a bracket 70 connected to the frame upright 15 and a lower bracket 71 which extends down to and is connected to the rearward frame plate 45. The shaft 14 has an eccentric 72 mounted thereon for rotation therewith and the eccentric has a ball bearing unit fitting closely between the inner side walls 74 of a housing 75 which constitutes a follower for the eccentric 72 and whose outer side is closed by a plate 76. The housing 75 is rigidly mounted on the blade hanger 32, there being a housing for each blade hanger and the construction being generally similar at each end of the intermediate cross shaft 14.

The edges of the housing side walls 74 and its upper and lower end walls 77 and 78 are machined so that they will closely fit against the outer side surfaces of the housing plates 69.

When the shaft 14 is rotated, the eccentrics 72 will rotate and cause reciprocation of the housings 75 and the blade hangers 32. The eccentric 72 and its bearing 73 is confined in the housing 75 and on the inner side of the housing plate 69 so that dust and dirt cannot enter the housing and damage the bearing. One of the great difficulties with sod cutters has been the inability to properly seal the drive mechanism so that grit and dirt will not rapidly cause it to wear.

When the blade hangers 32 are shifted vertically to or from a lowered cutting position, the additional length of the interior of the housing 75 as compared to the diameter of the bearing 73 permits said housing 75 to shift readily without interfering with the cam or eccentric bearing 73. When this adjustment is made the edges of the housing will slide on the housing plate 69 and the close contact between the housing and said plate will be maintained.

The rear portion of the frame is supported by a ground wheel 79 mounted in a fork 80. The fork extends forwardly and as shown in Figure 4 is pivotally connected to a bracket 81 on the rearward frame plate 45. Another fork 82 extends upwardly and somewhat forwardly from the wheel axle 83. A helical spring 84 is connected between the upper end of the fork 82 and a bracket 85 which extends downwardly from a platform 86 suspended between the steering handles 43. For purposes of convenience the platform 86 also supports a fuel tank 87 which supplies fuel for the internal combustion engine 13.

The roller 12 which supports the forward portion of the machine is preferably rubber covered and its circumferential surface is provided with a plurality of spaced knobs 88 which are generally conical in shape and taper outwardly and terminate in rounded outer ends. It is preferred that the knobs 88 have a height of approximately one (1) inch and that they be about three-fourths (¾) of an inch in diameter at their bases. However, what is more important is that these knobs be spaced apart a distance approximately twice the diameter of the knobs at their bases. The object is to provide knobs which will give proper traction, since the roller 12 is connected to the power plant and causes the machine to move over the ground, and also to cause proper gripping without damage to the sod. A roller approximately as described has been found to be highly effective.

From the foregoing description, it will be seen that I have provided a sod cutter which is compact in structure and which is substantially free from damage by dirt and grit. It has its blade hanger so positioned that it lies closely behind the traction roller so that uneven ground will not cause any appreciable variation in the depth of cut and the blade hanger can be adjusted to various vertical positions to either completely remove the blade from the turf or to vary the depth of cut.

Highly efficient traction roller and clutch structure is provided and the rear wheel 79 is mounted for yielding movement. This not only facilitates travel over uneven ground but is highly important at the time the clutch is engaged. At the time of this latter operation, the torque of the traction roller 12 will cause a downward pressure at the rear of the machine. The yieldable wheel mounting at the rear permits the machine to give considerably in a downward direction. This cushions the shock of engagement of the clutch tooth 67 with the sprocket 63.

It will, of course, be understood that various changes may be made in the form, details, arrangement and proportions of the various parts without departing from the scope of my invention.

What I claim is:

1. In a sod cutting machine having a substantially horizontal blade pivotally supported by at least one substantially vertical blade hanger, means for effecting actuation of said blade comprising a power driven circular cam device eccentrically mounted for rotation at one side of the cutting blade hanger and adjacent thereto, and a cam follower mounted directly on said blade hanger intermediate the ends thereof and movable with the blade hanger and comprising spaced relatively fixed parts between which said circular cam is positioned and against which the circular cam constantly engages to cause the blade to be reciprocated along a substantially horizontal path, the power thrust of the eccentric being applied rearwardly of the cutting blade for both forward and rearward movement of the blade hanger and blade.

2. The invention according to claim 1, wherein the said fixed parts of the cam follower are in the form of elongate members having a length materially greater than the diameter of the circular cam device and having opposing straight flat parallel surfaces against which the cam device bears at diametrically opposite points, and means for longitudinally moving the hanger for adjusting the elevation of the blade, said greater length of said fixed parts facilitating the longitudinal adjustment of the hanger relative to the cam device.

3. In a sod cutting machine having a frame, a vertical blade hanger pivotally mounted by its upper end portion for swinging movement on such frame, a blade carried by the lower end portion of said blade hanger for reciprocable movement, a power actuated circular cam device eccentrically mounted for rotation upon such frame to one side of and adjacent to the medial portion of said hanger and at an elevation well above said blade, a housing for and completely enclosing said cam device, said housing being in two parts, one part of the housing being mounted on said hanger and having opposing walls in close fitting relation with the periphery of the cam device for imparting swinging movement to said blade hanger to reciprocate the blade rapidly forwardly and backwardly and the other part of the housing comprising a stationary wall through which the rotary axis of the cam device passes and relative to which the said one part of the housing moves during movement of the hanger.

4. The invention according to claim 3, wherein said opposing walls of the housing have a length materially greater than the diameter of the circular cam device and extend longitudinally of the hanger, means for longitudinally moving the hanger for adjusting the elevation of the blade, and the said stationary wall forming said other part of the housing having a materially greater height and width than said one part whereby said one part may move to a limited extent and said housing will be maintained fully closed around the cam device.

5. The invention according to claim 3, wherein said cam device comprises a central circular element of relatively small diameter and a circular bearing unit having inner and outer circular parts separated by rotatable elements, the said inner part encircling the central element and the said outer part having peripheral bearing against said opposing walls.

References Cited in the file of this patent

UNITED STATES PATENTS

| | | |
|---|---|---|
| 1,342,836 | Wendtland | June 8, 1920 |
| 2,015,587 | Bready | Sept. 24, 1935 |
| 2,164,246 | Kirkpatrick | June 27, 1939 |
| 2,266,924 | Tway | Dec. 23, 1941 |
| 2,284,826 | Kroeger | June 2, 1942 |
| 2,327,930 | Ranney | Aug. 24, 1943 |
| 2,345,425 | Phillips | Mar. 28, 1944 |
| 2,433,709 | Rodgers | Dec. 30, 1947 |
| 2,550,522 | Bolongaro | Apr. 24, 1951 |

FOREIGN PATENTS

| | | |
|---|---|---|
| 316,730 | Great Britain | Aug. 8, 1929 |
| 512,817 | France | Oct. 23, 1920 |